(12) United States Patent
Ekin

(10) Patent No.: US 7,936,903 B2
(45) Date of Patent: May 3, 2011

(54) METHOD AND A SYSTEM FOR DETECTING A ROAD AT NIGHT

(75) Inventor: Ahmet Ekin, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 823 days.

(21) Appl. No.: 11/916,058

(22) PCT Filed: May 16, 2006

(86) PCT No.: PCT/IB2006/051547
§ 371 (c)(1),
(2), (4) Date: Nov. 30, 2007

(87) PCT Pub. No.: WO2006/129218
PCT Pub. Date: Dec. 7, 2006

(65) Prior Publication Data
US 2008/0199045 A1    Aug. 21, 2008

(30) Foreign Application Priority Data

May 31, 2005  (EP) ..................................... 05104679

(51) Int. Cl.
*G06K 9/00* (2006.01)

(52) U.S. Cl. ........ 382/104; 382/103; 382/118; 382/141; 382/157; 382/224; 382/225; 382/226; 345/7; 250/330; 250/334; 348/149

(58) Field of Classification Search .................. 382/103, 382/104, 118, 141, 157, 224, 225, 226; 250/330, 250/334, 342; 345/7; 348/149; 359/630
See application file for complete search history.

(56) References Cited

U.S. PATENT DOCUMENTS

| 5,023,451 | A | | 6/1991 | Burley |
| 5,809,161 | A | * | 9/1998 | Auty et al. ..................... 382/104 |
| 6,504,951 | B1 | | 1/2003 | Luo et al. |
| 6,759,949 | B2 | | 7/2004 | Miyahara |
| 6,807,287 | B1 | * | 10/2004 | Hermans ....................... 382/104 |
| 7,139,411 | B2 | * | 11/2006 | Fujimura et al. ............... 382/103 |

(Continued)

FOREIGN PATENT DOCUMENTS

| WO | 03019494 A1 | 3/2003 |
| WO | 2004029659 | 4/2004 |

OTHER PUBLICATIONS

Hough transformation based approach for road border detection in infrared images Intelligent Vehicles Symposium, 2004 IEEE Parma, Italy Jun. 14-17, 2004, Piscataway, NJ, USA,IEEE, Jun. 14, 2004, pp. 549-554, XP010727706 ISBN: 0-7803-8310-9.*

(Continued)

*Primary Examiner* — Daniel G Mariam
*Assistant Examiner* — Nancy Bitar

(57) ABSTRACT

A method of detecting a road feature in an image signal derived from an infrared-sensitive camera. The method, in overview, comprises processing an image frame by assigning binary values to pixels in the frame in response to their representative temperature, and then to analyze spatially the binary mask to identify regions of pixels having mutually similar assigned binary values. The road feature is subsequently found from the analysis of the identified regions of mutually similar binary values and a visual indication of the road feature in relation to the image frame provided to the user.

15 Claims, 6 Drawing Sheets

810    820

830    840

U.S. PATENT DOCUMENTS 7,566,851 B2 * 7/2009 Stein et al. .................... 250/205
2007/0211482 A1 * 9/2007 Rebut ............................ 362/466

OTHER PUBLICATIONS

Farbi B et al: "Hough Transformation", Intelligent Vehicles Symposium, 2004 IEEE, pp. 549-554, XP010727706, Jun. 14-15, 2004.

Fengliang Xu et al: "Pedestrain Detection and Tracking", http://gscrlig1.eng.ohio-state.edu/flxu/publications/papers/pedestrian_its.pdf, Mar. 2005.

T. Tsuji et al: "Development of Night-Vision System", IEEE Transactions on Intelligent Transportation Systems, vol. 3, No. 3, pp. 203-209, Sep. 2002.

* cited by examiner

810

820

830

840

METHOD AND A SYSTEM FOR DETECTING A ROAD AT NIGHT

The present invention relates to a night vision system for detecting a road at night or in poor visual conditions based on a signal generated from an infrared camera. The invention further relates to a method of detecting a road at night or in poor visual condition from images obtained from an infrared camera. The invention further relates to data carrier storing instructions for a data processor which when loaded into a computer system performs a method a method of detecting a road at night or in poor visual conditions.

Almost 70% of accidents involving pedestrians occur at night. One of the main reasons for such accidents is a decrease in visibility at night. Furthermore, some people are also hampered by decreased visual acuity at night due to specific visual problems. Thus automotive companies are interested in providing drivers with on-board systems that include automated obstacle/object detection or computer-enhanced imagery of roads at night. This requires an efficient road detection system.

Due to the insufficiency, or the absence, of illumination of a road at night, infrared (IR) cameras that sense the temperature of objects have a potential to replace or supplement vision-based systems. The main application of night vision systems is the robust detection of objects on a road so as to warn a driver or to enhance a view available to the driver.

Road detection at night using a single infrared camera has been previously described in connection with the detection of pedestrians. Recently, a road detection algorithm that helps in the identification of possible pedestrians has been presented in international PCT patent application no. WO 2004/029659. The patent application describes a road detection algorithm based on a characteristic that a road will appear as a smooth surface having constant intensity after a translation of temperature values from the image area to a greyscale code. Under such premise, edge detection techniques such as the Sobel edge detection algorithm allow the road pattern to be identified. There are however several drawbacks of the aforementioned techniques. The road marks will be identified as edges separating the road into several surfaces. The road may present a textured pattern, no constant intensity over its surface, which will reduce the effectiveness of the edge detection techniques. The sky will also present a smooth surface and might have the same edge and texture properties as the road. Moreover, no explicit methods have been described to separate road from sky.

Hence, an improved and more robust road detection method for use at night or in poor visual conditions would be advantageous, and in particular a vision system for detecting a road at night or in poor visual conditions would be advantageous.

The present invention is based on the observation that a road has low temperature at night; hence, it results generally in low intensity pixel values in an infrared camera image frame in comparison to the rest of the landscape observed in the image frame. The present invention is also based on the observation that the vast majority of situations in which a driver of a vehicle is exposed to poor visual conditions occur during the winter months where average temperatures are low and infrared cameras can also provide useful information during daytime. The present invention is further based on the fact that if road and sky appear as a single surface in the image obtained from an infrared camera, they will be typically joined at a line coincident with the horizon.

It is an object of the invention to provide a method and a system for detecting a road at night that overcomes the problems of the prior art. It is a further object of the invention to provide a method and a system for detecting a road at night that is robust and cost efficient.

The objects of the invention are obtained by a method for detecting a road at night or in poor visual conditions, said method being based on an image frame and being executed by a computer, said image frame being divided into pixels, each having an intensity value assigned corresponding to a temperature of a point of an environment that the image frame represents, said method comprising the steps of:
  calculating a mask by detecting in said image frame pixels candidating to represent a road;
  selecting from the road candidate pixels an initial cluster of road candidate pixels having a lower boundary coinciding with or being located in the vicinity of the lower part of the image frame as an estimate of the road;
  determining an initial horizon estimate as a first horizontally oriented boundary between horizontal regions characterized by different densities of road candidate pixels;
  defining a final road cluster by correcting the selected initial cluster of road candidate pixels having an upper boundary, said correction being based on the location of said upper boundary relative to the initially estimated horizon and a predetermined upper limit for the location of the horizon.

The detection of road candidate pixels may be based on a calculation of a first threshold, from the pixel intensity values of said image frame, where the road candidate pixels are detected by comparing each pixel intensity value to said first threshold value.

The first threshold value may in one aspect of the invention be calculated as the mean of the pixel values in said image frame. Thereby, surprisingly, a useful first threshold value is obtained. The calculation of the threshold thereby is simplified by providing a reduction of computer proceeding requirements. However, the first threshold value, may in another aspect of the invention be weighed with the standard deviation of the pixel intensity values in said image frame.

The initial horizon estimate may be calculated from a vertical projection of the road pixel candidates of said mask and the derivative of said projection. Thereby, a calculation efficient way of determining a horizon is obtained.

The initial horizon estimate is based on
  a second horizon estimate determined as the uppermost row of the mask having an absolute value of a derivative larger than a predetermined constant; or
  an average of said second horizon estimate and a first horizon estimate, wherein said first horizon estimate is determined as the uppermost row of the mask having a vertical projection larger than the sum of a vertical projection, of a predetermined row of the mask and said a predetermined constant.

The selection of the road candidate pixels comprises identifying connected clusters of equal candidate pixel values in the mask, and selecting the largest coherent cluster, that is larger than a predetermined percentage of all pixels, and has a lower boundary located below a certain row of the mask.

The identification of connected clusters of equal pixel values in the mask is in an aspect of the invention performed by applying a connected component labelling algorithm to the mask.

The selection of a final road cluster comprises:
  correcting the initial road cluster, if the upper boundary of the initial road cluster is above a preselected second threshold by redefining the upper boundary of the initial road cluster with the initial horizon estimate; and selecting the initial road cluster, and adjusting the horizon estimate to be coinciding with the upper boundary of the initial road cluster, if the upper boundary of the initial road cluster is located below or at said predetermined second threshold.

Thereby it is achieved that the final road estimate becomes more precise because the method thereby is weighed with the information in the image that is most likely to be relevant to the road estimate.

The objects of the invention are further obtained by system for detecting a road at night or in poor visual conditions, the system comprising one or more data processors and one or more data memories, the system is storing data in the one or more memories representing an image frame being divided into pixels, each having an intensity value assigned corresponding to a temperature of a point of an environment that the image frame represents, the system is provided with instructions which upon execution by the one or more processors adapt the system to:

calculating a mask by detecting in said image frame pixels candidating to represent a road;

selecting from the road candidate pixels an initial cluster of road candidate pixels having a lower boundary coinciding with or being located in the vicinity of the lower part of the image frame as an estimate of the road;

determining an initial horizon estimate as a first horizontally oriented boundary between horizontal regions characterized by different densities of road candidate pixels;

defining a final road cluster by correcting the selected initial cluster of road candidate pixels having an upper boundary, said correction being based on the location of said upper boundary relative to the initially estimated horizon and a predetermined upper limit for the location of the horizon.

In one aspect of the invention the system further comprises a single infrared camera for obtaining an image frame. Thereby a cost efficient, yet robust system can be obtained In another aspect of the invention the system however may comprise multiple infrared cameras for obtaining image frames. Thereby the system and the method according to the invention can be applied in a more traditional system for calibrating the multiple cameras.

In another aspect of the invention the system is further adapted to displaying an image of the final road cluster to a user. Thereby, the user, i.e. the driver of a vehicle in which the system is applied may react to the displayed image of the road and thereby improve his driving, when the visual conditions are poor, e.g. at night.

The objects of the invention are further obtained by a data carrier storing instructions for a data processor which when loaded into a computer system performs the method described above.

In the present context the term "derivative" is used to denote a numerical difference between two numbers or vectors.

In the present context the terms "above" and "below" and "upper" and "lower" refers to orientations in the image frame as usually perceived in connection with viewing an image, unless otherwise is stated.

In the present context the term "cluster" refers to a coherent group of pixels having like pixel values.

The present invention will now be explained, by way of example only, with reference to the accompanying Figures wherein.

Figure 7:
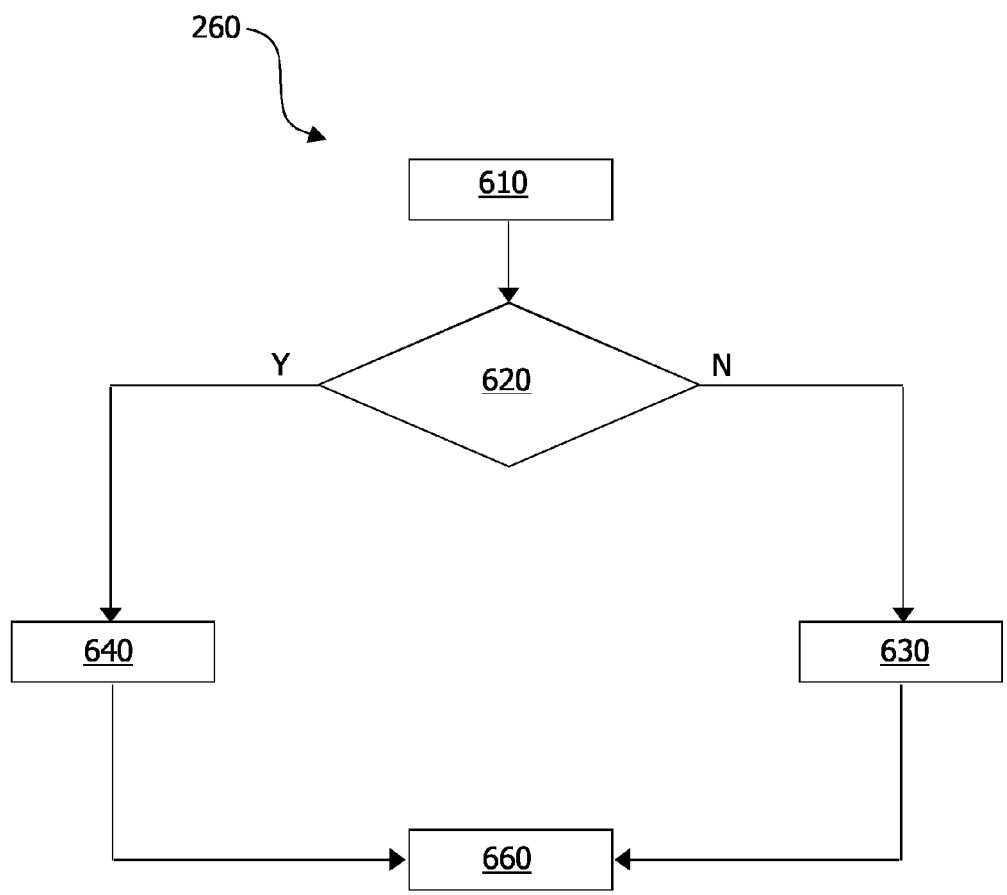
Figure 8:
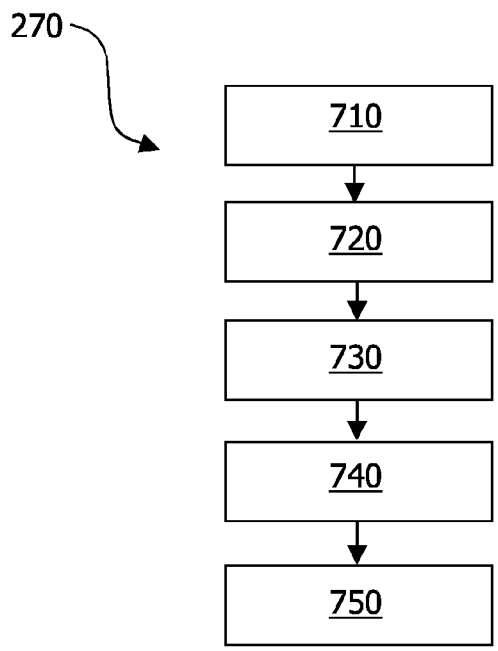
Figure 9:
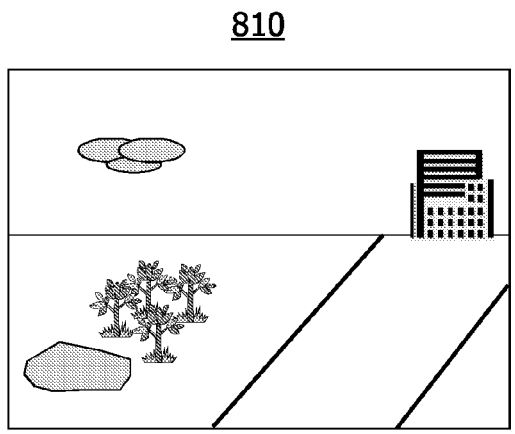
Figure 9:
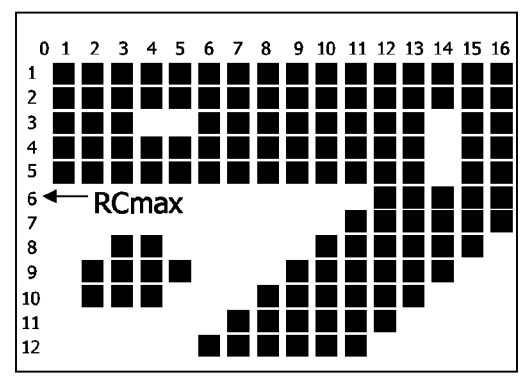
Figure 9:
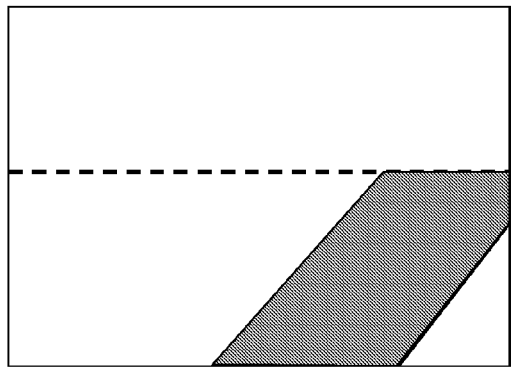
Figure 9:
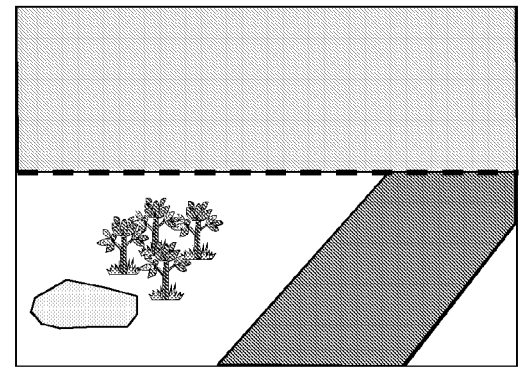

FIG. 7 is a flow chart illustrating an algorithm for correcting a road definition based on a second threshold for sky appearance and a situation of the horizon according to the second aspect of the invention FIG. 8 is a flow chart illustrating an algorithm for presenting a road superimposed on a corresponding original infrared image according to an embodiment of the invention; and FIG. 9 schematically illustrates an example of the operation of the method of detecting a road at night or in poor visual condition. The example includes an image of a landscape, as it might appear in daylight, intermediate steps of the algorithm operation on the image, and a resulting image where a calculated road, horizon estimate and sky region are superimposed to the original image.

Figure 1:
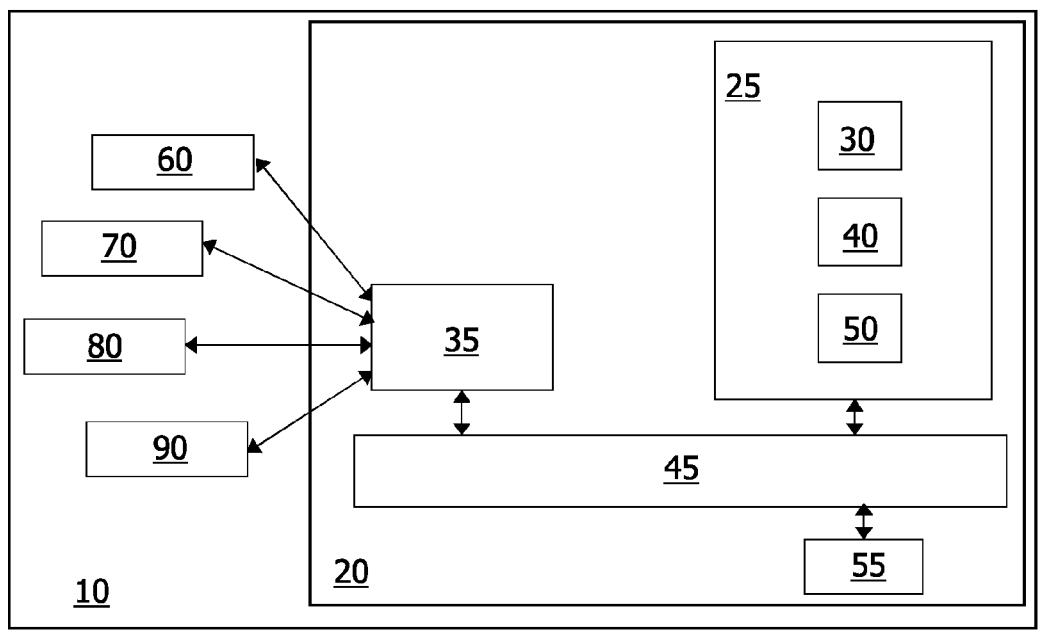
FIG. 1 is a block diagram illustrating a system for detecting a road at night or in poor visual conditions according to a first aspect of the invention.

In FIG. 1 there is shown a schematic of a system for detecting a road at night or in poor visual conditions 10 comprising a computer system 20, an infrared camera 60, a display 70, an audiovisual alarm 80 and a series of control keys 90. The computer system 10 comprises a memory 25, an input/output controller 35, a communications bus 45 and a processor 55. The memory 25 comprises an image frame storage module 30, an alarm module 40 and a road detection module 50. The infrared camera 60, the display 70 and the audiovisual alarm 80 are coupled to the computer system 20 via, for example, a coaxial cable, a twisted pair cable or by means of a radio frequency connection. The input/output controller 35, the memory 25, and the processor 55 are mutually coupled via the communication bus 45. The frame storage module 30, the alarm module 40 and the road detection module 50 are placed within the memory 25. The control keys 90 can, for example, allow starting and stopping the system among other possible applications.

In one application of the invention, the system for detecting a road at night or in poor visual conditions 10 may be placed in a vehicle, e.g. automobile, motorcycle or truck, helping the driver, user, recognize the road ahead while driving.

Operation of the system for detecting a road at night or in poor visual conditions 10 will now be described. The processor 55 receives an image frame from the infrared camera 60 via the input/output controller 35 and the communications bus 45. The frame is stored in the memory 25, more specifically in the frame storage module 30. The processor 55 receives operating instructions from a road detection module 50 and provides an estimation of the road surface as observed from the image frame received from the infrared camera 60 and stored in the frame storage module 30. Furthermore, the processor 55, in one embodiment of the invention superimposes an estimated road surface onto the image frame received from the camera 60 and presents a corresponding resulting image on the display 70. The processor 55, in a second embodiment may alternatively or additionally receive operating instructions from the alarm module 40 and, for example, advises the driver of the automobile by means of audiovisual alarms 80 when there is no road identified in the infrared image received from the camera 60. Alternatively or additionally the alarm module 40 may provide feedback information to a servo control system, keeping the car within the road limits.

Figure 2:
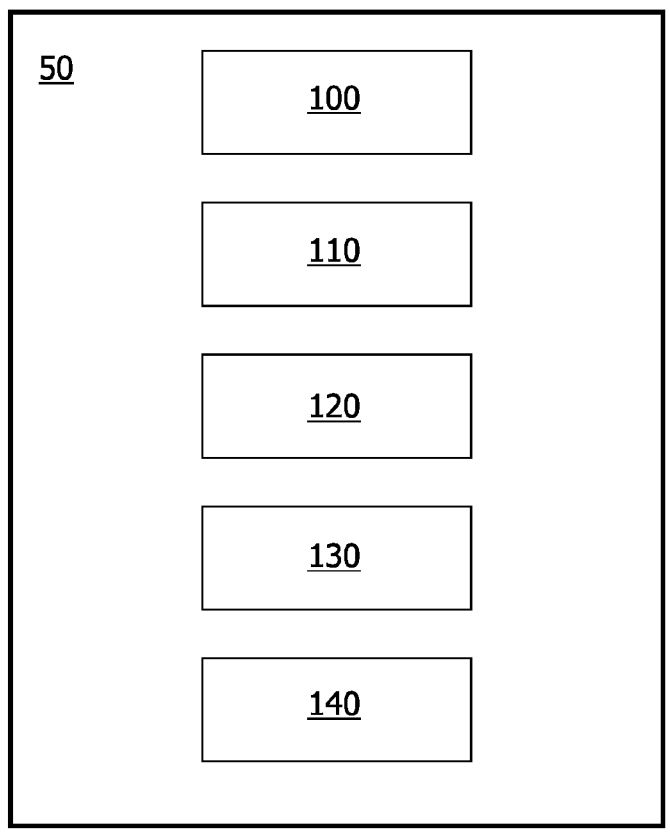
FIG. 2 is a block diagram illustrating a road detection module according to the first aspect of the invention.

The road detection module 50 is illustrated in greater detail in FIG. 2 wherein the module 50 includes a road pixel candidate detection module 100, an initial horizon estimation module 110, a road definition module 120, and a road/horizon correction module 130. In one embodiment of the invention a display presentation module 140 may supplement the method. The processor 55, receives instructions from the road detection module 50, and sequentially executes the instructions by way of the road pixel candidate detection module 100, the initial horizon estimation module 110, the road definition module 120, and the road/horizon correction module 130. In one embodiment of the invention the module will finally execute the instructions included in a display presentation module 140.

Figure 3:
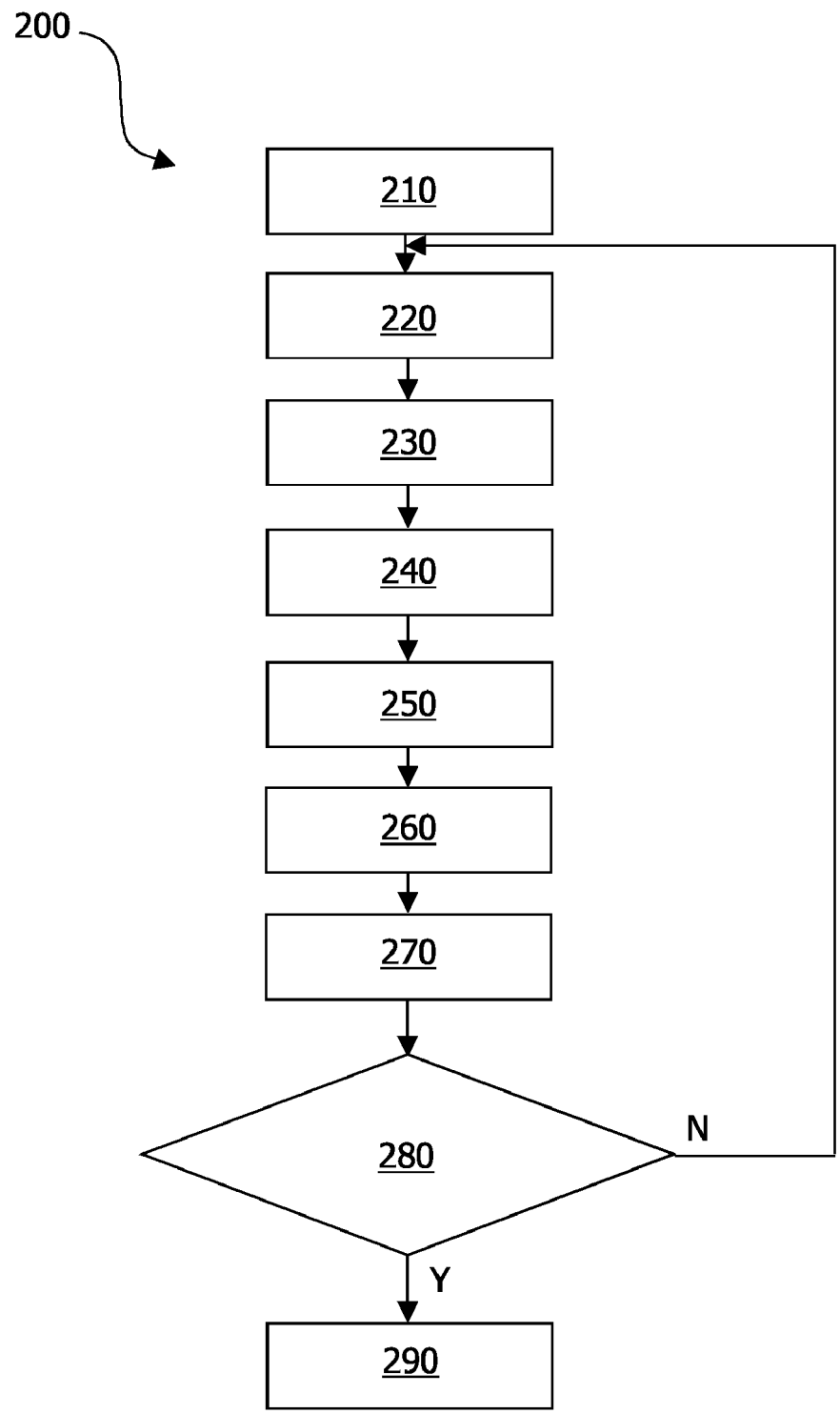
FIG. 3 is a flow chart illustrating a method of detecting a road at night or in poor visual condition from images frames obtained from a single infrared camera according to a second aspect of the invention.

A flow chart presenting steps of a method of detecting a road at night or in poor visual condition from images obtained from a single infrared camera is indicated generally by 200 in FIG. 3. The method is preferably carried out as an algorithm by the road detection module 50 in the system 10 shown in FIG. 1. The method comprises steps of: detecting system start pressed 210, accessing a next image frame when available 220, detecting road candidate pixels 230 providing a binary mask, estimating the horizon 240, defining a road in the binary mask 250, correcting the road and horizon 260 if found necessary, optionally presenting the image in a display 270 and checking if the user has indicated a stop to processing further frames 280.

When the system start is pressed 210 by means of the control keys 90 and the new image frame has been made available in the frame storage module 30, the image frame is accessed 220 and the algorithm step of detecting road candidate pixels 230 is executed. Based on a binary mask obtained from the candidate pixels 230, the initial horizon estimation 240 and the road definition 250 algorithms are carried out. A final decision on the identity of the road and placement of the horizon is obtain in an algorithm for correction of road and/or horizon 260. The original infrared image frame, together with the road and horizon estimations, is then preferably presented 270 in the display 70. Finally, the algorithm 200 checks if a system stop signal, e.g. inputted by the user, using control keys 90, can be identified 280; if no stop signal is observed, the algorithm 200 accesses a new image frame and then executes the aforementioned steps once again. If a system stop signal is observed, the algorithm 200 will set itself into a standby situation 290 waiting for a new system start to be pressed 210.

The image frame obtained from the infrared camera generally will consist of a matrix of pixels, ($x_{max}$*$y_{max}$), where $x_{max}$, indicates the number of pixels available in the horizontal direction, i.e. the number of columns, and $y_{max}$, indicates the number of pixels available in the vertical direction, i.e. the number of rows. Each pixel will be assigned with a specific value representing the temperature of the area of the image the pixel relates to. Pixel values will generally change intensity with each image frame. In the following description the top row of the image is assigned the row value, i=1, and the bottom row of the image is assigned the row value, i=$Y_{max}$.

Figure 4:
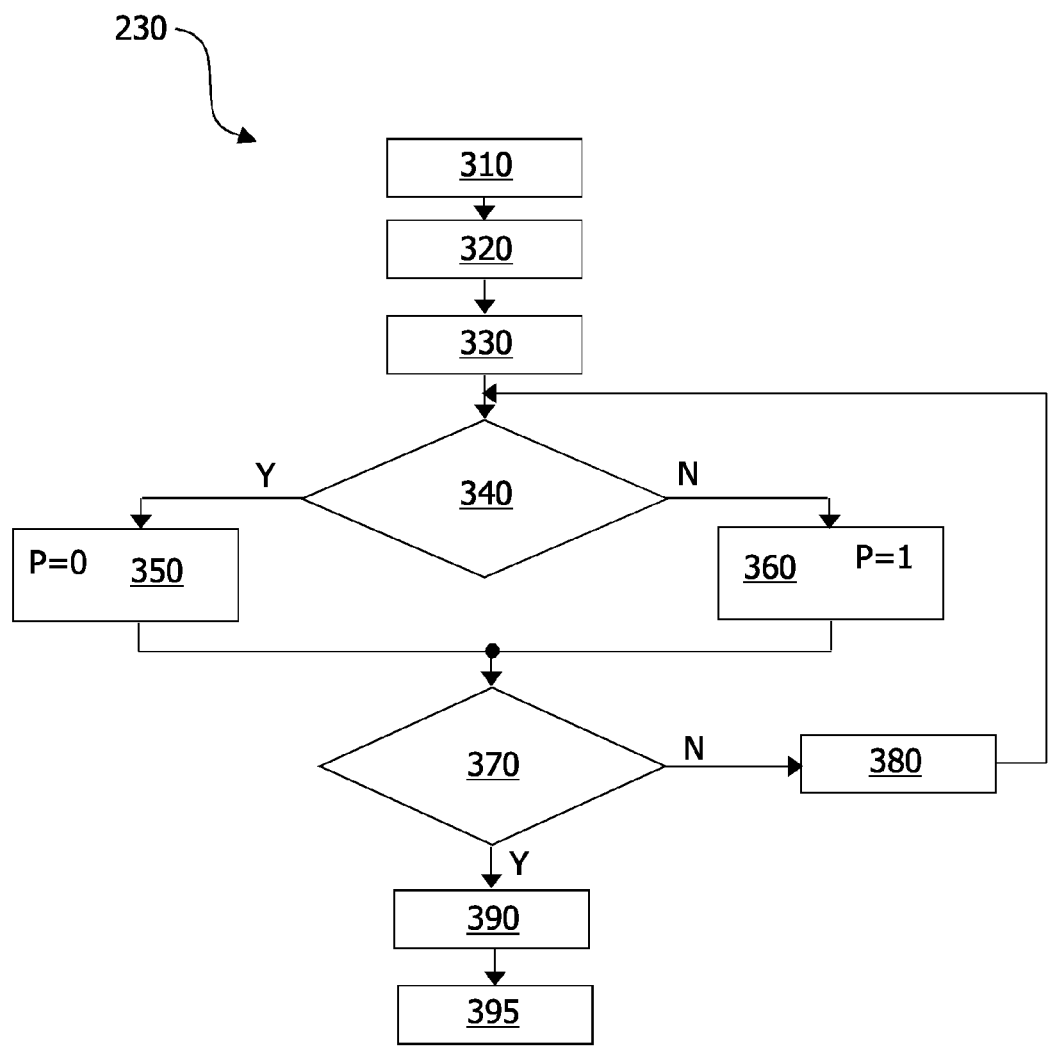
FIG. 4 is a flow chart illustrating an algorithm for detecting road candidate pixels and providing a binary mask of an original infrared image according to the second aspect of the invention.

In FIG. 4, a flow chart concerning an algorithm for detecting road pixel candidates 230 is shown. The algorithm is carried out when the processor 55 receives the instructions that constitute the road pixel candidate detection module 100 shown in FIG. 2. The algorithm 230 comprises steps of: starting by making a copy of the image frame to be analyzed 310, estimating a threshold value 320, accessing a first pixel from the image frame 330, evaluating 340 if the pixel intensity is above the threshold value estimated in step 340, assigning the pixel a zero value 350, P=0, or a one value 360, P=1, checking if the pixel evaluated is the last one in the image 370, accessing a next pixel image 380, creating and storing a binary mask of road pixel candidates 390 and ending 395.

Once a first/next frame has been made available 220, the road candidate pixel algorithm 230 starts 310 by making a copy of the frame image to be analyzed in the memory image frame storage module 30. A threshold value, Th, is generally estimated 320 as a function of the mean value of the intensity of the image frame pixel values, $\bar{I}$, and their standard deviation, $\sigma_I$. This function is shown in equation (1), where $k_1$ and $k_2$ are parameters that determine the contributions of the two statistics, namely $\bar{I}$ and $\sigma_I$. Depending on the specific application, optimal values of these parameters, $k_1$ and $k_2$, can be found. In one embodiment of the present invention, the threshold value, Th, is directly calculated as being the mean value of the intensity of the infrared image pixel values, $\bar{I}$, indicating that $k_1$ is considered unity and $k_2$ zero. This embodiment has the advantages of avoiding intensive computing processing in order to evaluate the standard deviation, $\sigma_I$, and ensuring low cost. The performance of the aforementioned embodiment has been carefully investigated and compared to the optimum threshold values including the standard deviation. Results indicate that when used in the road detection application, this approach of the present invention provides a pseudo-optimum situation while reducing the processing requirements.

$$Th = k_1 \times \bar{I} + k_2 \times \sigma_I \qquad (1)$$

In situations where there is a need, with no direct connection to the presented invention, for the calculation of the standard deviation, $\sigma_I$, both $k_1$ and $k_2$ are used. A detailed experimental investigation involving images obtained in a broad range of conditions indicates that optimum performance is achieved when both, $k_1$ and $k_2$, were assigned a value of 0.5.

In the next step of the algorithm 230, the first pixel of the infrared image is accessed from the frame storage module 30 and its intensity value compared to the threshold estimated 340. If the intensity of the pixel is above the threshold, Th, 350, the pixel P is assigned a value 0. If the intensity of the pixel is equal to or smaller than the threshold, Th, the pixel will be assigned a value 1. This procedure tries to extract the pixels having relatively low temperature as candidates for road pixels. In step 370 of the method it is checked if the accessed pixel is a last one from the image frame. If it is the last pixel, the binary mask including all road pixel candidates will be stored in the frame storage module 30. If it is not the last pixel, the next pixel P will be accessed 380 and a new comparison to the threshold value, Th, is carried out 340 until the final pixel is reached ending the execution of the road candidate pixels 395. The step 360 is presented in equation (2) where the definition of a binary mask, R(x,y), is a function of the intensity of the pixels in the infrared image, I(x,y), and the threshold value, Th.

$$R(x, y) = \begin{cases} 1 & I(x, y) \le Th \\ 0 & I(x, y) > Th \end{cases} \quad (2)$$

Figure 5:
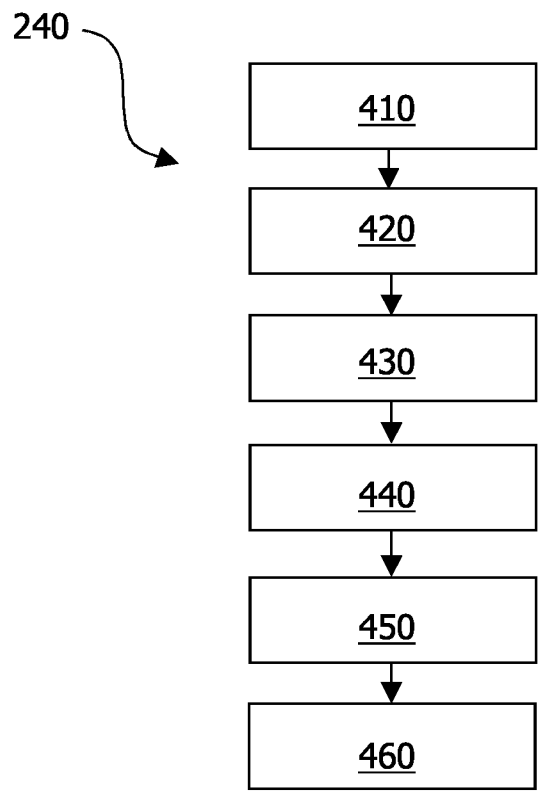
FIG. 5 is a flow chart illustrating an algorithm for estimating a horizon according to the second aspect of the invention.

A flow chart presenting steps of an algorithm for initially estimating the horizon 240 is shown in FIG. 5. The algorithm is carried out when the processor 55 receives the instructions that constitute the initial horizon estimation module 110 shown in FIG. 2. The algorithm comprises steps of: accessing a binary mask of road pixel candidates 410, calculating a vertical projection of the pixels 420, calculating a derivate of the vertical projection 430, calculating a first horizon estimation 440, calculating a second horizon estimation 450, deciding upon final horizon estimate and storing its location 460.

The vertical projection calculation 420 entails calculating, for each row of pixel data accessed from the binary mask of road pixel candidates 410, the sum of all pixel values and storing the sum in a vector, $P_v(y)$, in memory. This step can be represented mathematically as the calculation of $P_v(y)$, as presented in equation (3). The next step in the algorithm is the calculation of a derivate of a vertical projection, $P_{Dv}(Y)$, 430; this is computed as shown in equation (4), wherein N is the row difference between the elements to be subtracted in the differentiation process. A detailed experimental investigation involving images originated from a broad range of conditions led to the conclusion that N=3 provided optimum performance of the algorithm. Small variations from this optimum value, N=3, e.g., N=2, N=4, N=5, however will have no significant influence in the precision of the algorithm. Tests were primarily carried out on image frames comprising (320×240) pixels. If the infrared image has other dimensions in terms of pixels ($x_{max} \times y_{max}$), the value of N will scale generally to a value within the margins represented in equation (5).

$$P_v(y) = \sum_x R(x, y) \quad (3)$$

$$P_{Dv}(y) = \begin{cases} P_v(y) - P_v(y - N) & y > N \\ 0 & y \le N \end{cases} \quad (4)$$

$$\frac{y_{max}}{120} \le N \le \frac{y_{max}}{48} \quad (5)$$

A first horizon estimate 440 is calculated by the evaluation of equation (6). A comparison is initiated from the top image row, i=1, and checked subsequently until a row is found that matches the inequality presented in equation (6), where $H_1$ represents the row number where the horizon is estimated.

$$H_1 = \arg \min_i (P_v(i) > P_v(i_{up}) + T_{Large}) \quad (6)$$

In Equation (6), $i_{up}$ indicates a row above which there is a high probability of finding the sky area, and $T_{Large}$ is defined as a constant comprising contributions from an expected width of the road at horizon (width being defined in terms of the number of pixels it comprises) and road pixel candidates originated from noise. Noise in the image frame may arise from objects having temperature characteristics similar to the road, or simply from the recording of the image.

The calculation of the first horizon estimate 440 is particularly relevant in cases when the sky temperature is generally above the threshold value, Th, and their pixels have been generally not taken into account as road candidate pixels.

In the case wherein the lowest row of the binary mask, i=$Y_{max}$, has been reached with no row matching the inequality, the first horizon estimate 440 is dismissed and the algorithm 240 will only consider the second horizon estimate 450 in the decision 460 upon generating a final horizon estimate. The later described situation will occur, for example, in the case where all sky pixels have a temperature below the average temperature.

In one embodiment of the invention where the infrared image frame obtained comprised a matrix of 320*240 pixels in the horizontal and vertical directions respectively, $i_{up}$ is considered to be between 30 and 70 and $T_{Large}$ to be between 20 and 80. These values were obtained from a detailed experimental investigation involving images obtained in a broad range of conditions. If the infrared image has other dimensions in terms of pixels ($x_{max} \times y_{max}$), the values of $i_{up}$ and $T_{Large}$ will scale generally to values within the margins represented in equations (7) and (8).

$$\frac{y_{max}}{8} \le i_{up} \le \frac{y_{max}}{3.5} \quad (7)$$

$$\frac{x_{max}}{16} \le T_{max} \le \frac{x_{max}}{4} \quad (8)$$

The second horizon estimate 450 is based on an observation that there should be a large local derivative of the vertical projection, $P_v(y)$, at the horizon. This estimate 450 is calculated by evaluating equation (9). The comparison is initiated from the top image row, i=1, and checked subsequently until a row is found that matches the inequality presented in equation (9), where $H_2$ represents the row number where the horizon is estimated.

$$H_2 = \arg \min_i (|P_{Dv}(i)| > T_{Large}) \quad (9)$$

In the case wherein the lowest row of the binary mask, i=$Y_{max}$, has been reached with no row matching the inequality of equation (9), i.e. no horizon has been identified, the second horizon estimate 450 is considered to be outside the binary mask, i.e. the horizon must lie over what is displayed in the image frame. The second horizon estimate will be assigned a value of zero, $H_2$=0, in order to avoid uncertainty in further steps of the algorithm.

The decision and storage of the initial horizon estimate 460 is based on the first horizon estimate 440 and the second horizon estimate 450. If no first horizon estimate, $H_1$, is found, the initial horizon estimate, H, 460 is equal to the second horizon estimate, $H_2$. If both a first and a second horizon estimates have been calculated, the initial horizon estimate, H, will be calculated according to equation (10), i.e. as an average of the two estimates, providing a best accurate estimation in the examples analyzed.

$$H = \frac{H_1 + H_2}{2} \quad (10)$$

Figure 6:
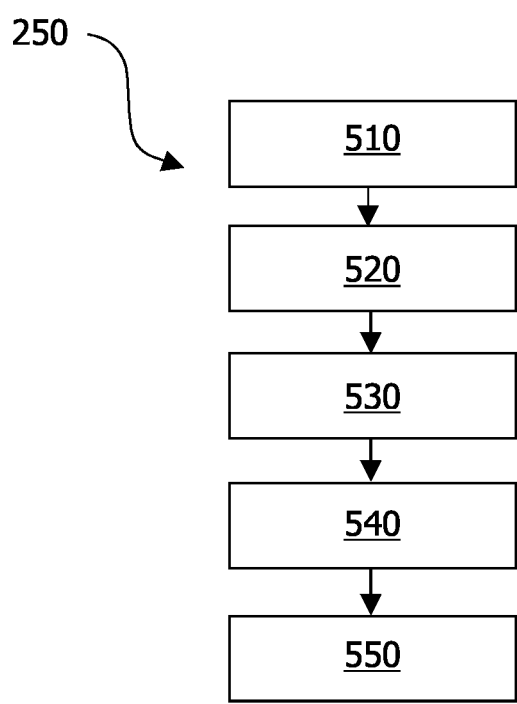
FIG. 6 is a flow chart illustrating an algorithm for identifying and detecting a road from a binary mask of road pixel candidates according to the second aspect of the invention.

In FIG. 6, a flow chart concerning the algorithm 250 that allows defining a road in the image frame is shown. The algorithm is carried out when the processor 55 receives the instructions that constitute the road definition module 120 shown in FIG. 2. The algorithm comprises steps of: accessing the binary mask of road pixel candidates 410, applying a connected component labelling algorithm to the binary mask 520, identifying road candidates 530, selecting the road 540 from the candidates, and computing and storing the minimum-bounding box of the selected road 550.

The connected component labelling algorithm 520 comprises steps of scanning the binary mask pixel by pixel, from top to bottom and left to right of the mask, in order to identify regions of adjacent pixels which mutually similar intensity values; in this case, adjacent pixels of mutually similar value that are marked with a one. It is possible to use different measurements of connectivity in the implementation of the component-labelling algorithm. In one embodiment of the invention, an 8-connectivity is used. Use of a 4-connectivity is also possible but will influence the accuracy of the algorithm in its estimate of the road. The algorithm provides a list of road candidate regions 530 represented in an x-y plane from which the road is selected 540 based on three principles In the following description, the lowest y-coordinate of the image, y=1, corresponds to the top part of the image and the highest y-coordinate of the image, $y=Y_{max}$, corresponds to the bottom part of the image. The first principle is that a valid road region has to cover at least a certain percentage of the total number of pixels. The second principle is that a road candidate region should be placed within a specific area of the screen and its maximum y-coordinate, $Ry_{max}$, should be higher than a certain predefined constant, $RC_{min}$. The third principle is that the road is considered to be the largest road candidate regions that comply with the first and second principle. Finally the minimum bounding box of the road is computed and stored in memory 550. A detailed experimental investigation involving images obtained in a broad range of conditions indicated that the road candidate should be considered valid if it covers at least a 10% of the total amount of pixels. In one embodiment of the invention, where the infrared image obtained consists of a matrix of 320×240 pixels, $RC_{min}$ is considered equal to 120, indicating that the lowest part of the road, i.e. its highest y-coordinate, is expected to be within the lower half, i.e. bottom part, of the image. If the infrared image has other dimensions in terms of pixels ($x_{max} \times y_{max}$), the value $RC_{min}$ will scale generally to the value represented in equation (11).

$$RC_{min} = \frac{Y_{max}}{2} \quad (11)$$

A flow chart presenting steps of an algorithm 260 used for the correction of the road and/or the horizon is presented in FIG. 7. The algorithm is carried out when the processor 55 receives the instructions that constitute the road/horizon correction module 130 shown in FIG. 2. In the following description, the lowest y-coordinate of the image, y=1, corresponds to the top part of the image and the highest y-coordinate of the image, $y=Y_{max}$, corresponds to the bottom part of the image. The algorithm 260 comprises steps of:

accessing an initial horizon estimate and a minimum bounding box of the road 610;
comparing a minimum vertical y-coordinate value of the road minimum bounding box to a predetermined second threshold 620, $N_{sky}$;
correcting if necessary the horizon 630;
correcting if necessary the maximum vertical (y) coordinate of the road 640; and
finally storing the updated horizon and bounding box of the road 660.

The horizon estimate 240 has been previously described in relation to FIG. 5 and the minimum bounding box road definition 250 has been previously described in relation to FIG. 6.

The algorithm for correction of the road and/or horizon 260 is initiated by comparing 620 a minimum vertical y-coordinate value of the road minimum bounding box, $Ry_{min}$ to a predetermined second threshold, $N_{sky}$. As a first option of the comparison, if $Ry_{min}$ is lower than $N_{sky}$, then the horizon estimate, H, is analyzed. If the horizon estimate, H, is equal to zero, the road minimum bounding box is not modified. If the horizon estimate, H, is different from zero then the road minimum bounding box is modified to include only the part that is below the horizon, H, i.e. erasing all pixels from the road candidate region with a vertical component lower than the horizon value, H. As a second option of the comparison, if $Ry_{min}$ is higher or equal than $N_{sky}$, the horizon estimate is modified and its value redefined to be equal to the minimum vertical y-coordinate value of the road minimum-bounding box, $Ry_{min}$. Finally, the new minimum bounding box of the road, if modified, and the new horizon, if modified, are stored in memory 660. In one embodiment of the invention, where the infrared image obtained consisted of a matrix of 320×240 pixels, the $N_{sky}$ is considered to be between 30 and 70. These values were obtained from a detailed experimental investigation involving images obtained in a broad range of conditions. If the infrared image has other dimensions in terms of pixels ($x_{max} \times y_{max}$), the value of $N_{sky}$ will scale generally to a value within the margins represented in equation (12).

$$\frac{y_{max}}{8} \leq N_{sky} \leq \frac{y_{max}}{3.5} \quad (12)$$

The presently described criteria for correcting the initial road cluster adapt to the method for most situations that can be conceived of during e.g. a drive through a landscape or a city. However, special situations may occur for which additional criteria may be implemented in the correction algorithm 260.

In FIG. 8, a flow chart concerning and algorithm for the presentation of relevant information 270 obtained from the method 200 of detecting a road at night or in poor visual conditions superimposed on the corresponding infrared image frame is shown. The algorithm 270 comprises steps of: accessing the original infrared image frame 710, superimposing a bounding box of a road 720 if specified by the user, superimposing an estimated horizon 730 if specified by the user, superimposing a bounding box of a sky 740 if specified by the user and presenting a final image to the user 750 in a display 70.

The user may decide, e.g. by means of the control keys 90, which features are presented in the display 70, in addition to the corresponding original infrared image obtained from the frame storage module 30. The sky and road features can be presented in the display by means of different colour code allowing the user an easy visual identification. The choices include from none to all of the following choices:

Bounding box of the road 720
Horizon estimate 730
Bounding box of the sky 740

The bounding box of the sky 740 is calculated as the area above the horizon estimate, when the sky estimate is available. In the case where one or more of the elements specified are not available, the user may be advised of the situation, e.g. by means of audiovisual alarms 80, e.g. a message shown in the display 70.

An example illustrating the operation of the method of detecting a road at night or in poor visual condition is presented in FIG. 9. The example includes a landscape 810, as it might appear in daylight, road candidate pixels included in the binary mask 820, originated from the infrared image frame, a horizon estimate and a road bounding box 830, as obtained from the algorithm applied to the infrared image frame, and a final image presented to the screen 840, where road, horizon estimate and sky region are superimposed to the original image frame.

The example illustrated in FIG. 9, represents the application of the algorithm 200 based on an image with a reduced resolution of 16×12. The example illustrated is characterized by having a sky region with temperature of the sky being below the average temperature of the image frame. The low temperature of the sky provides road candidate pixels in the sky region as can be observed in the binary mask 820. Even though the sky bounding box constitutes the biggest bounding box it is discarded as a road candidate as its highest y-coordinate lies above a certain position, $RC_{min}$, considered to be 6 in the example presented. The algorithm provides as an outcome, the horizon estimate and the road bounding box 830, which in addition to the sky region are in one embodiment of the invention superimposed to the original infrared image frame 840 to provide the user navigation information on the display 70.

It will be appreciated that the embodiments of the invention described in the foregoing are susceptible to being modified without departing from the scope of the invention as defined by the accompanying claims.

In the accompanying claims, numerals and other symbols included within brackets are included to assist understanding of the claims and are not intended to limit the scope of the claims in a any way.

Expressions such as "comprise", "include", "incorporate", "is" and "have" are not to be construed in a non-exclusive manner when interpreting the description and its associated claims, namely construed to allow for other items or components which are not explicitly defined also to be present. Reference to the singular is also to be construed to be a reference to the plural and vice versa.

In summary, the invention concerns a method of detecting a road feature in an image signal derived from an infrared-sensitive camera. The method, in overview, consists in processing an image frame by assigning binary values to pixels in the frame in response to their representative temperature, and then to analyze spatially the binary mask to identify regions of pixels having mutually similar assigned binary values. The road feature is subsequently found from the analysis of the identified regions of mutually similar binary values and a visual indication of the road feature in relation to the image frame provided to the user.

The invention claimed is:

1. A method for detecting a road at night or in poor visual conditions, said method being based on an image frame and being executed by a computer, said image frame, I, being divided into pixels, each having an intensity value assigned corresponding to a temperature of a point of an environment that the image frame represents, said method comprising the steps of calculating a mask, R, (230) by detecting in said image frame pixels candidates to represent a road; selecting (250) from the road candidate pixels an initial cluster of road candidate pixels having a lower boundary coinciding with or being located in the vicinity of the lower part of the image frame as an estimate of the road; determining an initial horizon estimate (240) as a first horizontally oriented boundary between horizontal regions characterized by different densities of road candidate pixels; defining a final road cluster (260) by correcting the selected initial cluster of road candidate pixels (250) having an upper boundary, said correction being based on the location of said upper boundary relative to the initially estimated horizon and a predetermined upper limit for the location of the horizon.

2. A method according to claim 1, wherein said detection of road candidate pixels (230) is based on a calculation of a first threshold, Th, from the pixel intensity values of said image frame, and wherein the road candidate pixels (230) are detected by comparing each pixel intensity value to said first threshold value, Th.

3. A method according to claim 2, wherein said first threshold value, Th, is calculated as the mean, Ī, of the pixel values in said image frame.

4. A method according to claim 3, wherein said first threshold value, Th, is weighed with the standard deviation, $\sigma_1$, of the pixel intensity values in said image frame.

5. A method according to claim 1, wherein said initial horizon estimate (240) is calculated from a vertical projection, $P_v$, of the road pixel candidates of said mask, R, and the derivative, $P_{Dv}$, of said projection, $P_v$.

6. A method according to claim 5, wherein said initial horizon estimate (240) is based on:
a second horizon estimate, $H_2$, determined as the uppermost row of the mask, R, having an absolute value of a derivative, $P_{Dv}$, larger than a predetermined constant, $T_{Large}$; or
an average of said second horizon estimate H2 and a first horizon estimate $H_1$, wherein said first horizon estimate, $H_1$, is determined as the uppermost row of the mask, R, having a vertical projection, $P_v$, larger than the sum of a vertical projection, $P_v(i_{up})$ of a predetermined row of the mask, R, and said a predetermined constant, $T_{Large}$.

7. A method according to claim 1, wherein said selection of the road candidate pixels (250) comprises identifying connected clusters of equal candidate pixel values in the mask, R, and selecting the largest coherent cluster, that is larger than a predetermined percentage of all pixels, and has a lower boundary located below a certain row, $RC_{max}$, of the mask, R.

8. A method according to claim 7, wherein said identification of connected clusters of equal pixel values in the mask, R, is performed by applying a connected component labelling algorithm to the mask, R.

9. A method according to claim 1, wherein said selection of a final road cluster (260) comprises:
correcting (640) the initial road cluster (250), if the upper boundary of the initial road cluster is above a preselected second threshold ($N_{sky}$) by redefining the upper boundary of the initial road cluster with the initial horizon estimate; and
selecting (630) the initial road cluster (250), and adjusting the horizon estimate to be coinciding with the upper boundary of the initial road cluster, if the upper boundary of the initial road cluster is located below or at said predetermined second threshold, $N_{sky}$.

10. A system for detecting a road at night or in poor visual conditions, the system comprising one or more data processors and one or more data memories, the system is storing data in the one or more memories representing an image frame, I, being divided into pixels, each having an intensity value assigned corresponding to a temperature of a point of an environment that the image frame represents, the system is provided with instructions which upon execution by the one or more processors adapt the system to: calculating a mask, R, (230) by detecting in said image frame pixels candidates to represent a road; selecting (250) from the road candidate pixels an initial cluster of road candidate pixels having a lower boundary coinciding with or being located in the vicinity of the lower part of the image frame as an estimate of the road; determining an initial horizon estimate (240) as a first horizontally oriented boundary between horizontal regions characterized by different densities of road candidate pixels; defining a final road cluster (260) by correcting the selected initial cluster of road candidate pixels (250) having an upper boundary, said correction being based on the location of said upper boundary relative to the initially estimated horizon and a predetermined upper limit for the location of the horizon.

11. A system according to claim 10, further comprising a single infrared camera for obtaining an image frame, I.

12. A system according to claim 10, comprising multiple infrared cameras for obtaining image frames, I.

13. A system according to claim 10, wherein the system is further adapted to displaying an image of the final road cluster (260) to a user.

14. A system according to claim 12, comprising calibrating the multiple cameras.

15. A non-transitory computer-readable medium storing instructions for a data processor which when loaded into a computer system performs a method according to claim 1.

* * * * *